(12) United States Patent
Feygin

(10) Patent No.: US 6,575,364 B1
(45) Date of Patent: Jun. 10, 2003

(54) METHODS AND APPARATUS FOR EMBEDDED MAGNETICALLY RECORDABLE LABELING

(75) Inventor: Ilya Feygin, Mountainside, NJ (US)

(73) Assignee: Pharmacopeia, Inc., Cranbury, NJ (US)

( * ) Notice: Subject to any disclaimer, the term of this patent is extended or adjusted under 35 U.S.C. 154(b) by 0 days.

(21) Appl. No.: 09/225,533

(22) Filed: Jan. 4, 1999

(51) Int. Cl.⁷ .................................................. G06K 7/08
(52) U.S. Cl. ...................................... 235/449; 235/493
(58) Field of Search ................................. 235/439, 449, 235/462.01, 493, 486; 340/572.6, 825.31, 825.34

(56) References Cited

U.S. PATENT DOCUMENTS

| | | | | |
|---|---|---|---|---|
| 3,656,473 A | * | 4/1972 | Sodickson et al. | 128/2 R |
| 3,774,179 A | * | 11/1973 | Wiegand et al. | 340/174 ZB |
| 4,367,043 A | * | 1/1983 | Sweet et al. | 356/338 |
| 4,408,122 A | * | 10/1983 | Casden | 235/449 |
| 4,568,921 A | * | 2/1986 | Pokalsky | 341/572 |
| 4,678,894 A | * | 7/1987 | Shafer | 235/416 |
| 4,751,186 A | * | 6/1988 | Baisch et al. | 436/47 |
| 4,925,629 A | * | 5/1990 | Schramm | 422/82.05 |
| 5,204,526 A | * | 4/1993 | Yamashita et al. | 235/493 |
| 5,401,110 A | | 3/1995 | Neeley | 400/621 |
| 5,464,973 A | | 11/1995 | Depres | 235/494 |
| 5,658,456 A | | 8/1997 | Kenley et al. | 210/85 |
| 5,663,545 A | | 9/1997 | Marquiss | 235/375 |
| 5,736,929 A | * | 4/1998 | Schrott et al. | 340/572 |
| 5,831,532 A | * | 11/1998 | Gambino et al. | 340/572 |
| 5,909,176 A | * | 6/1999 | Schrott et al. | 340/572.1 |
| 6,029,891 A | * | 2/2000 | Freeman et al. | 235/380 |
| 6,100,026 A | * | 8/2000 | Nova et al. | 435/6 |

FOREIGN PATENT DOCUMENTS

WO          9820974      *   5/1998   .................. 235/439

* cited by examiner

Primary Examiner—Daniel St. Cyr
(74) Attorney, Agent, or Firm—Priest & Goldstein, PLLC

(57) ABSTRACT

A magnetically recordable label embedded within a plastic object such as a microtiter plate. The label comprises a magnetic recording medium such as a recording wire, and is concealed within the object or within a sealed enclosure attached to the object. The label can be written to or read from by a recording head passing adjacent to the label. Because the label is completely enclosed, it is shielded from degrading effects that may be present in the environment.

21 Claims, 6 Drawing Sheets

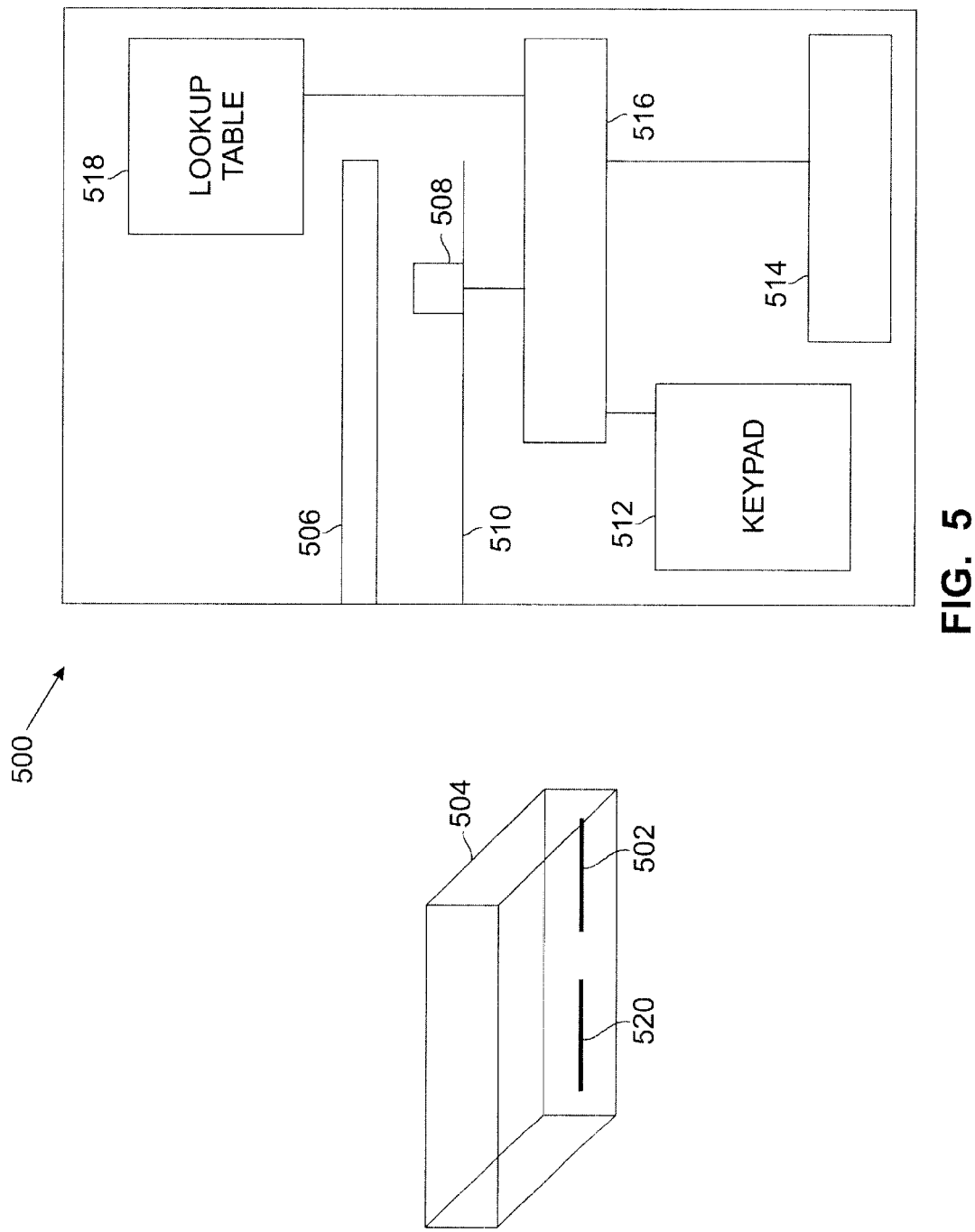

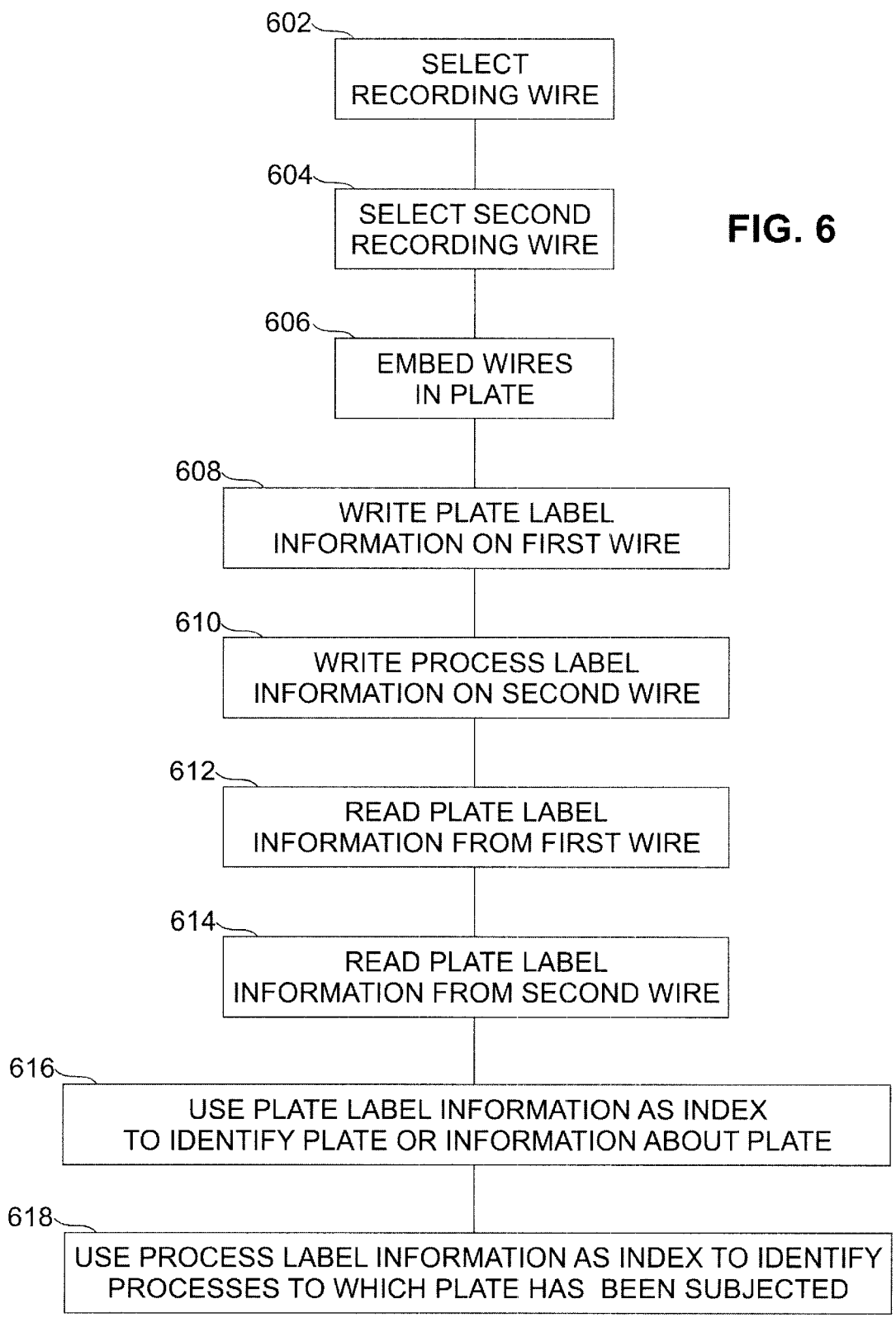

METHODS AND APPARATUS FOR EMBEDDED MAGNETICALLY RECORDABLE LABELING

FIELD OF THE INVENTION

The present invention relates generally to improved techniques for labeling microtiter plates and the like. More particularly, the invention relates to a high information capacity machine-readable magnetic label formed from magnetic recording wire and embedded in a microtiter plate or the like. Among several aspects, increased resistance to environmental degradation is provided.

BACKGROUND OF THE INVENTION

Labels are used under many conditions, in many different environments. In particular, chemical laboratories and operations include many objects in which labeling is critical, such as microtiter plates and the like. In many environments in which such plates are employed, chemicals, reagents, solvents and the like may degrade a typical label over time. One example of an object for which labeling is important, and which is commonly used in an environment likely to degrade a typical label, is a microtiter plate used in growing cell cultures for synthesizing and/or screening chemical compounds. A microtiter plate typically contains a number of wells, each well holding a separate sample or culture. The number of wells in a plate may be very large, on the order of tens or hundreds of wells in a single plate. For example, 1536-well plates are increasing in popularity in a number of applications. Each plate therefore holds numerous cultures or samples in its wells, with each culture or sample having a significant amount of work invested. Each plate must be properly identified during each handling step, and a misidentification can cause a plate to be subjected to an incorrect process or environment, or can result in the loss of valuable information about the structures or activities of compounds. It is important, therefore, that a microtiter plate be accurately labeled, since the cost of an inaccurate or misread label can be very high. Moreover, each label must contain sufficient information to uniquely distinguish the plate with which it may be associated. Additionally, as microtiter plates continue to be developed it is possible to add more and more wells to smaller and smaller plates. This potentially increases the information content needed in a label, while simultaneously decreasing the space available for the label. An example of a plate having a large number of wells combined with a relatively small dimension is a 1536-well plate, which is gaining in popularity. These plates have dimensions of approximately 3 inches by 5 inches.

Barcode labels can provide sufficient information density to serve as labels for microtiter plates, but the use of barcode labels encounters certain inherent problems. The simplest way of using a barcode label is to print a paper label and affix it to an object, such as a microtiter plate, through adhesion. However, this is difficult in the case of microtiter plates, as the plates are typically made of the most chemically inert materials available, such as, polypropylene or polystyrene, and these materials typically do not accept adhesives easily. Moreover, in the environment of a chemical laboratory a barcode label suffers from exposure to various reagents and solvents in the environment and is subject to degradation. This is a problem with any label that must be read by visual optical means, as each such label will typically be placed on an outer surface of the labeled object. Such placement allows the label to be contacted by, and degraded by, chemicals in the environment.

Various approaches have been taken to solve the problem of adhesion of a barcode label and of label degradation. These include laser etching of a label onto a plate, embedding of a radio frequency transmitter into the plate, color coding, embedding various fluorescent materials having differing emitting spectral frequencies, and other methods. Methods used to date have been expensive in production of the labeled plates or of the reading equipment, have not yielded sufficient information density in the label, or are insufficiently reliable.

There exists, therefore, a need in the art for a label having a high information capacity, which can be used in a chemical environment without the risk of an unacceptably high level of degradation due to environmental exposure to harsh chemicals and the like, which is reliable, and which is inexpensive to produce and read.

SUMMARY OF THE INVENTION

A label according to one aspect of the present invention includes a piece of magnetic recording medium, such as recording wire, embedded within a hollow in a microtiter plate. The recording wire is capable of storing information along its length by maintaining a pattern of sequentially magnetized segments. Information is encoded onto the wire by moving the wire adjacent a fixed recording head or, alternatively, by moving a recording head along the wire. The recording head emits a reversible-polarity field which magnetizes each segment of the wire to a desired polarity, thereby encoding information onto the wire by magnetizing sequential segments of the wire to either a north-south or a south-north polarity. Each magnetized segment has a width not less than the distance between the recording head and the wire. Similarly, the wire is read by moving the wire adjacent a read head or, alternatively, moving a read head along the wire. The sequentially magnetized segments of the wire induce field changes in a field emitted by the read head. The field changes are decoded to extract the information. The label data can be displayed to an operator or an automatic system in order to identify the plate. Alternatively, the label data can be used as an index to information about the plate, in order to allow retrieval of information.

A more complete understanding of the present invention, as well as further features and advantages of the invention, will be apparent from the following Detailed Description and the accompanying drawings.

BRIEF DESCRIPTION OF THE DRAWINGS

FIG. 5 illustrates a benchtop label reader according to the present invention; and FIG. 6 illustrates a method of labeling using an embedded magnetically recorded label according to the present invention.

DETAILED DESCRIPTION

Figure 1:
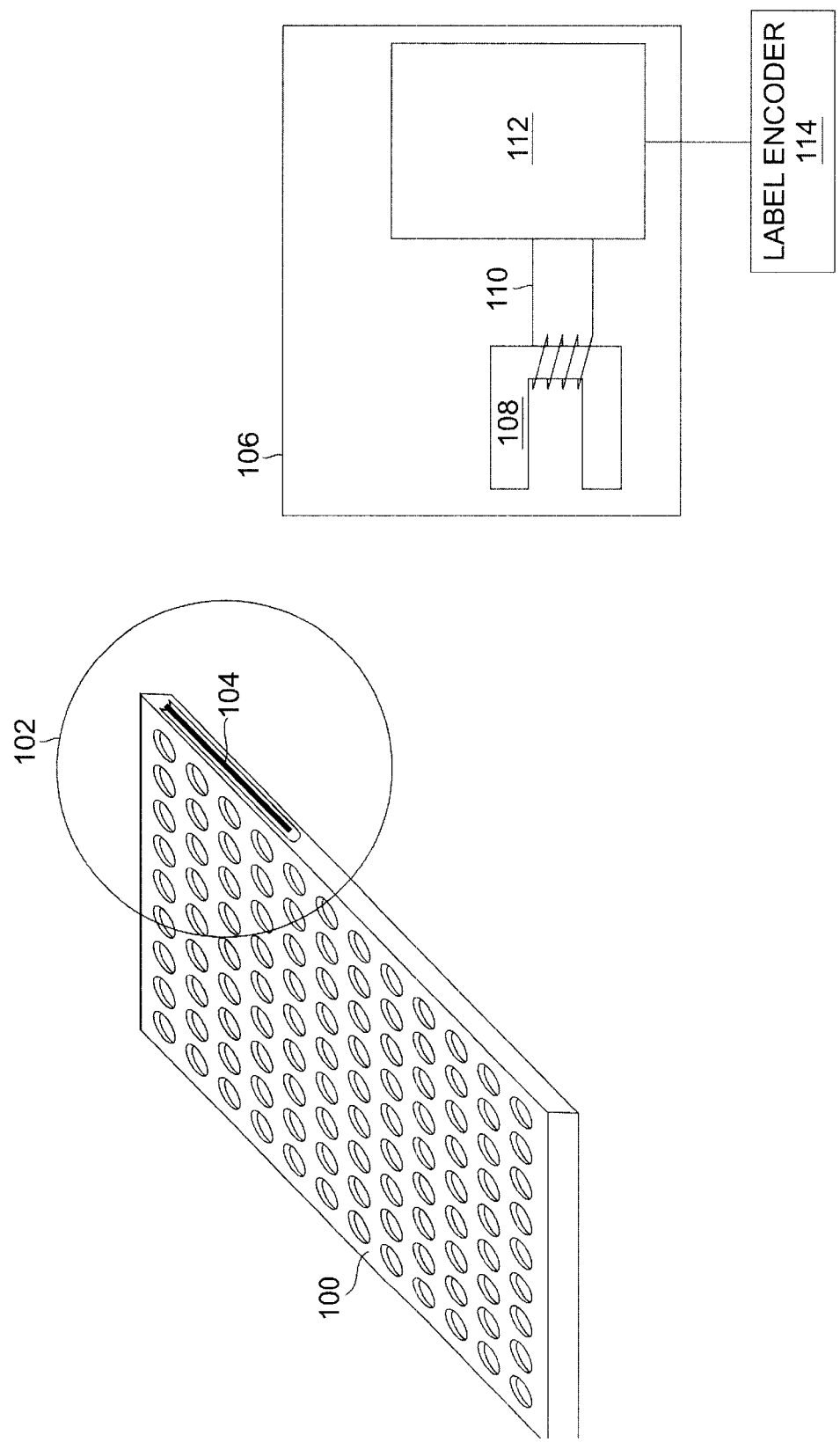
FIG. 1 illustrates a microtiter plate containing a wire label according to the present invention and a write head for recording information onto the label according to the present invention.

FIG. 1 illustrates a microtiter plate 100 having an illustrated section 102 in which is placed a recordable wire 104 according to the present invention. The recordable wire 104 is located near an outer surface of the plate 100, but is preferably not visible, preferably being completely concealed within the plate 100. The recordable wire is adapted to accept magnetization of segments with differing polarities. When these segments are created, they are capable of inducing changes in a magnetic field extending from outside the plate 100 to inside the plate 100. These changes can therefore be decoded to recover information recorded on the wire 104. The information recorded on the wire 104 is information serving to uniquely identify the plate 100. The wire 104 may be written to by passing a write head 106 along the wire 104. The write head 106 preferably includes an electromagnet 108 which when magnetized has adjacent north and south poles. A wire coil 110 is wrapped around the electromagnet 108. The wire coil 110 is connected to a current source 112, which is capable of passing a current through the wire coil 110, the current source 112 being able to pass current in either direction to induce a desired polarity in the electromagnet 108 as directed by a label encoder 114. As the write head 106 is passed along the wire 104, current is passed through the wire coil 110, according to the information desired to be written to the wire 104, to induce polarized segments along the wire 104. During the writing process, the write head 106 must be placed at a distance from the wire 104 less than or equal to the desired width of each segment to be created.

Figure 2:
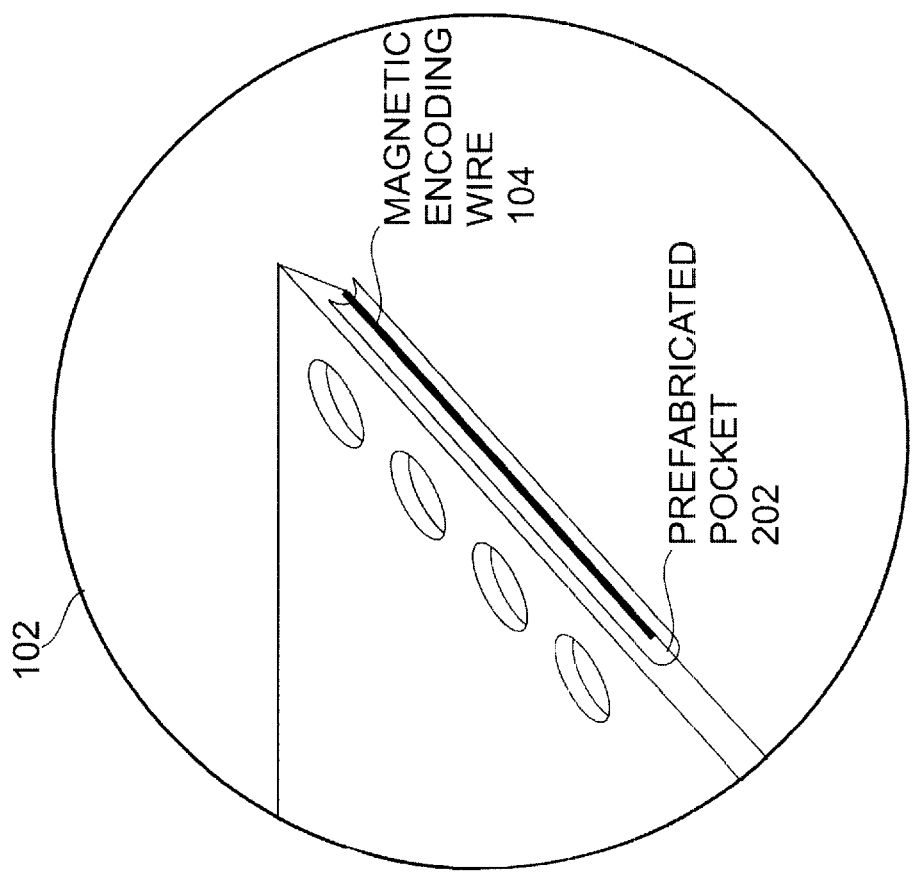
FIG. 2 illustrates additional details of an area of a microtiter plate containing a wire label according to the present invention.

FIG. 2 is a more detailed illustration of the illustrated section 102 of the microtiter plate 100. The recorded wire label 104 is located within a prefabricated pocket 202 of the plate 100. The recording wire 104 is chosen to emit a field extending a desired distance beyond the plate 100, and is preferably chosen of a corrosion resistant material such as stainless steel. The pocket 202 may conveniently be formed during a molding process and the recording wire 104 inserted at the time of molding, but the wire 104 may also be inserted after molding through cold or hot pressing, melting in, inserting in the groove, wrapping, gluing or any other chosen process. The pocket 202 is shown in a cutaway view so that the wire 104 can be seen, but the wire is preferably entirely embedded within the plate 100. This protects the wire from environmental degradation, but does not affect its usefulness as a label, because the wire 104 can be read from and written to by a field originating outside the plate 100, and can thus be read from and written to while protected within the plate 100.

Figure 3:
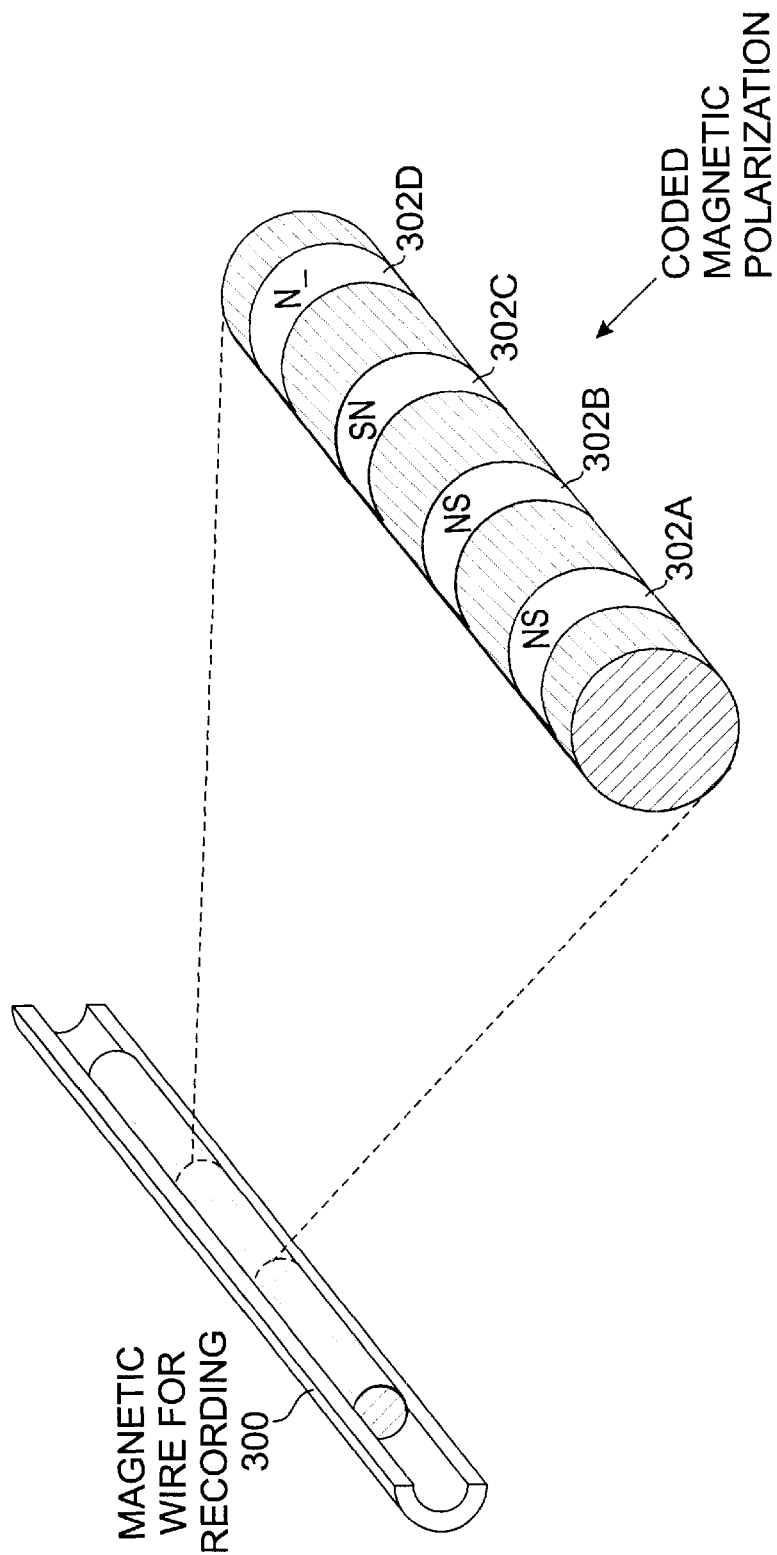
FIG. 3 illustrates a wire label according to the present invention, showing additional details of encodation of the information.

FIG. 3 illustrates a piece of recording wire 300 encoded according to the teachings of the present invention. Sections 302A–302D have been magnetized to form a label, with each of the sections 302A–302D representing a single bit. In the present illustration, a north-south orientation represents a binary one and a south-north orientation represents a binary zero, but any desired scheme for representation of bits may be suitably used. Commonly available recording wires allow storage of approximately 12 bits per inch.

Figure 4:
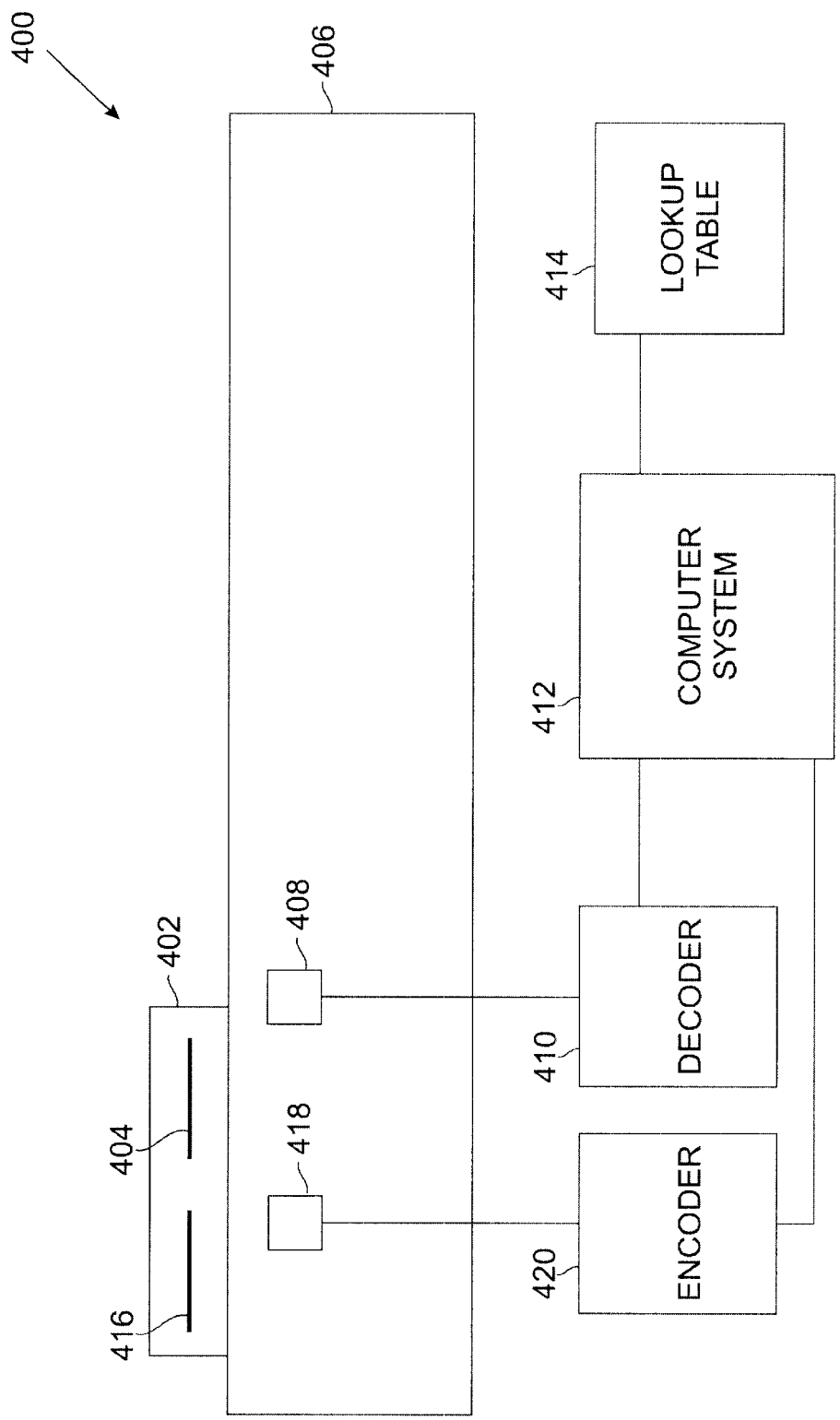
FIG. 4 illustrates a conveyor equipped with a label reader according to the present invention.

FIG. 4 illustrates a conveyor system 400 adapted to accommodate a microtiter plate such as the microtiter plate 402, which includes a plate label 404 according to the present invention, the plate label being a magnetic recording label containing information identifying the plate 402. The conveyor system 400 includes a conveyor belt 406 on which the microtiter plate 402 is placed. The microtiter plate 402 is passed through various stages. At each stage, one or more processes is carried out on each of one or more of the wells of the plate 402. As the plate 402 is placed on the conveyor system 402, the plate 402 passes a reading head 408 which is part of the conveyor system 400. The reading head is suitably connected to a decoder 410, which is in turn suitably connected to a computer system 412. The decoder 410 decodes the label information and provides it to the computer system 412. The computer system 412 uses the label information to identify the plate 402 and to control the operations performed on the plate 402. The computer system 412 preferably provides access to a lookup table 414 in which is stored information relating to the plate 402. Pertinent information is retrieved from the lookup table 414 during operations on the plate 402, and updated information is stored in the lookup table 414 as appropriate during operations on the plate 402.

The conveyor system 400 may also write information concerning processing to which the plate has been subjected. The plate 402 may suitably include a process label 416 on which can be stored information concerning operations performed on the plate 402. This information can be used by the computer system 412 for further authentication of a plate 402 and identification of the stage of processing of the plate 402. As the process label 416 passes the read head 408, the computer system 412 reads the process label 416 to determine the process information written on the label 416. If the process information on the label 416 matches the information stored in the lookup table 412, processing proceeds. If not, processing is halted and an operator is notified. After the label 404 and the process label 416 have been read, if processing is to proceed, the process label next passes by a write head 418, which is connected to an encoder 420. The computer system 412 supplies process information to the encoder 420, which writes the process information onto the process label 416. This is preferably done at the same time as the updating of the process information in the lookup table 414.

It should be noted that it is not necessary that process label information be written onto a special process label different from the plate label. If desired, process label information and plate label information can be written onto the same label, which can be read and interpreted to yield information about the identity of the plate, as well as the processes to which the plate has been subjected.

FIG. 5 illustrates a label reading device 500 used to read a plate label 502, according to the present invention, embedded in a microtiter plate 504. The plate 504 is inserted into a suitable slot 506 in the read/write device 500. The reading device 500 includes a read head 508 which is adapted to move along a track 510 adjacent to a position of the label 502 when the plate 504 is properly inserted into the slot 506. The read/write device 500 may suitably include a keypad 512 for entering selections, a display 514 for displaying information to a user, and programming and decoding circuitry 516 suitable for translating signals from the read head 508 into values to be displayed. When it is desired to read the plate label 502 on the plate 504, the plate 504 is inserted into the slot 506 and an appropriate selection is made on the keypad 512. The read head 508 moves alongside the label 502, and the varying polarity sections on the label 502 induce corresponding polarities in the read/write head 508. These polarities are transmitted to the control circuitry 516, translated into bits, and decoded. The control circuitry 516 may simply send the label information to the display 514 for reading by the operator, or may alternatively provide access to a lookup table 518 containing information about the plate 504. In that case, the plate label information would provide an index to the lookup table 518 so that the operator may choose to access information relating to the plate, such as the contents of each well or the stage in processing which the plate has reached. As the operator works on the plate 504, he may also enter updated information into the lookup table using the keypad 512. The updated information would thus be accessible at further stages in the processing of the plate 504.

The label reading device 500 may also read a second label, or process label 520 in the plate 504. The second label 520 would contain information about processes to which the plate 504 has been subjected. In the case of a process label 520, the lookup table 518 would contain process information indexed to the information on the process label 520, relating to processes to which the plate 504 has been subjected. The process information would be sent to the display 514 by the control circuitry 516.

A label reading device such as the device 500 provides convenience for an operator, giving the operator the ability to identify a plate and obtain information about the plate. A label reading device need not be of the particular configuration illustrated by the device 500, and may be designed in any of a number of different configurations, for example, with the read head being contained in a wand which the operator may pass along the plate 504 in the vicinity of the label 502.

FIG. 6 is a flowchart illustrating the steps of a method 600 of embedded labeling according to the present invention. At step 602, a first magnetic recording wire of a desired length is selected, with at least one inch of wire being provided for every 12 bits of label information desired, the first wire being adapted to serve as a label wire. At step 604, a second recording wire is selected, to serve as a process label wire. At step 606, the first wire and the second wire are embedded in a plastic object that is desired to be labeled. The first and second wire are preferably embedded during the molding process into a pocket or pockets formed prior to insertion of the wires, but embedding may be accomplished in any number of ways. At step 608, plate identification information is recorded on the first wire by appropriate polarization of sequential sections of the wire, preferably performed by either moving a write head or read/write head along the wire or, alternatively, by moving the wire alongside the write head or read/write head. At step 610, process information is recorded on the second wire to identify processes to which the plate has been subjected. At step 612, plate label information is read from the wire by decoding polarized sections along the wire, by moving a read or read/write head along the wire or by moving the wire along a read or read/write head. At step 614, process label information is read from the second wire, by decoding polarized sections along the wire, by moving a read or read/write head along the wire or by moving the wire along a read or read/write head. At step 616, the plate label information is used as an index to identify the plate or as an index to information about the plate, either as an index for storing information about the plate for later retrieval, or as an index for retrieval of information about the plate. The information associated with the label may advantageously be used to identify and control operations already performed or to be performed on the plate. At step 618, the process label information is used as an index to identify processes to which the plate has been, or will be, subjected thereby allowing interpreting the label information to identify the plate and/or the processes to which the plate has been or will be subjected. Steps 606 and 608–610 need not be performed in sequence, but instead any step may be performed when appropriate. Typically, step 608 is performed when a plate is fabricated, or alternatively when a plate is placed into operation or placed into reuse, and steps 610–618 are performed as required during operation on the plate.

While the present invention is disclosed in the context of a presently preferred embodiment, it will be recognized that a wide variety of implementations may be employed by persons of ordinary skill in the art consistent with the above discussion and the claims which follow below.

I claim:

1. A magnetically labeled microtiter plate, comprising:

a microtiter plate;

a first enclosure within the microtiter plate and adjacent to an outer surface of the microtiter plate; and a first magnetic recording medium within the enclosure, the recording medium being completely sealed within the enclosure, the recording medium being adapted to be read from and written to by a magnetic field penetrating from outside the microtiter plate to within the enclosure.

2. The magnetically labeled microtiter plate of claim 1 wherein the first recording medium is a magnetic recording wire.

3. The magnetically labeled microtiter plate of claim 2 wherein the first enclosure is a first prefabricated pocket within the microtiter plate.

4. The magnetically labeled microtiter plate of claim 3 and also including a second magnetic recording medium in a second enclosure adjacent to an outer surface of the microtiter plate.

5. A label writer for a microtiter plate containing one or more magnetic recording media, comprising:

an assembly for containing the microtiter plate;

an opening for insertion and removal of the microtiter plate;

a recording head within the assembly, the recording head being adapted to move along an enclosure within the microtiter plate and adjacent to an outer surface of the microtiter plate, the enclosure containing the one or more magnetic recording media, to write data onto the one or more magnetic recording media; and a control system within the assembly for directing writing of label data onto a magnetic recording medium by the recording head.

6. The label writer of claim 5 wherein the control system is further operative to direct writing of process information onto a magnetic recording medium by the recording head.

7. A label reader for a microtiter plate containing one or more magnetic recording media, comprising:

an assembly for containing the microtiter plate;

an opening for insertion and removal of the microtiter plate;

a recording head within the assembly, the recording head being adapted to move along an enclosure within the microtiter plate and adjacent to an outer surface of the microtiter plate, the enclosure containing the one or more magnetic recording media, to read data from one or more of the magnetic recording media.

8. The label reader of claim 7 wherein the recording head is further operative to write data onto the recording media.

9. A processing system for a microtiter plate comprising:

a transport system for transporting the plate through one or more processing steps;

a plate label reader for reading one or more magnetic plate labels sealed within an enclosure in the plate to obtain plate label information; and a control system for receiving the plate label information and using the plate label information to identify the plate, the control system being operative to use the plate label information to identify and control processes to which the plate is subjected.

10. The processing system of claim 9 and also including a lookup table for storing plate identification information indexed according to the plate label information.

11. The processing system of claim 10 wherein the plate label reader is further operative to read process label information identifying processes to which the plate has been subjected.

12. The processing system of claim 11 wherein the lookup table also includes process information indexed according to the process label information.

13. The processing system of claim 12 and also including a label writer for writing process information onto one or more of the magnetic plate labels.

14. A method of magnetic labeling of a microtiter plate, comprising the steps of:

providing a magnetic recording medium;

forming an enclosure within the microtiter plate; and sealing the magnetic recording medium into the enclosure.

15. The method of claim 14 and also including a step of writing label information onto the magnetic recording medium.

16. The method of claim 15 and also including a step of reading the label information from the magnetic recording medium.

17. The method of claim 16 wherein the enclosure is a prefabricated pocket within the microtiter plate.

18. The method of claim 17 wherein the magnetic recording medium is a magnetic recording wire.

19. The method of claim 18 and also including a step of writing process information onto the magnetic recording medium.

20. The method of claim 19 and also including a step of interpreting the label information to identify the plate.

21. The method of claim 20 and also including a step of interpreting the process information to identify processes to which the plate has been or will be subjected.

* * * * *